(12) United States Patent
Yun

(10) Patent No.: US 7,663,267 B2
(45) Date of Patent: Feb. 16, 2010

(54) VOLTAGE CONTROLLER FOR USE IN ELECTRONIC APPLIANCE USING A PLURALITY OF POWER SOURCES AND METHOD THEREOF

(75) Inventor: Yeo Sung Yun, Gumi-si (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 11/242,147

(22) Filed: Oct. 4, 2005

(65) Prior Publication Data
US 2006/0072266 A1    Apr. 6, 2006

(30) Foreign Application Priority Data
Oct. 5, 2004    (KR)    ........................ 10-2004-0079172

(51) Int. Cl.
*H02J 1/00* (2006.01)
(52) U.S. Cl. .............................................. 307/80
(58) Field of Classification Search .................. 307/80
See application file for complete search history.

(56) References Cited

U.S. PATENT DOCUMENTS

| 3,461,309 A | 8/1969 | Yamanaka et al. ............ 307/66 |
| 4,013,938 A * | 3/1977 | McCoy ..................... 363/56.01 |
| 4,384,214 A | 5/1983 | Crick et al. ..................... 307/66 |
| 5,196,781 A | 3/1993 | Jamieson et al. .............. 320/61 |
| 5,465,011 A | 11/1995 | Miller et al. ................... 307/64 |
| 5,598,041 A * | 1/1997 | Willis .......................... 307/43 |
| 6,064,179 A | 5/2000 | Ito et al. ...................... 320/128 |
| 6,785,754 B1 * | 8/2004 | Chao-Li et al. ............. 710/105 |
| 2002/0047309 A1 | 4/2002 | Droppo et al. ................ 307/43 |
| 2004/0183588 A1 | 9/2004 | Chandrakasan et al. ..... 327/545 |

FOREIGN PATENT DOCUMENTS

| JP | 09-284994 | 10/1997 |
| WO | WO 03/038980 A1 | 5/2003 |

OTHER PUBLICATIONS

Chinese Office Action dated May 18, 2007.

* cited by examiner

*Primary Examiner*—Fritz M Fleming
*Assistant Examiner*—Dru M Parries
(74) *Attorney, Agent, or Firm*—Ked & Associates LLP

(57) ABSTRACT

The present invention relates to a voltage controller equipped with an electronic appliance capable of using a plurality of power sources selectively and a method thereof. The plurality of power sources includes a battery power source and an adaptor power source. The voltage controller detects a voltage of a specific power source applied to the voltage controller and then converts an input power source into the specific power source. Further, the voltage controller cuts off an over voltage higher than a predetermined voltage.

21 Claims, 5 Drawing Sheets

VOLTAGE CONTROLLER FOR USE IN ELECTRONIC APPLIANCE USING A PLURALITY OF POWER SOURCES AND METHOD THEREOF

FIELD OF THE INVENTION

The present invention relates to a voltage controller for use in an electronic appliance using a plurality of power sources, and more particularly to a voltage controller for selecting an input power source by automatically detecting an input voltage thereof and cutting off a power source when over voltage is generated in an output line of the power source and method thereof.

BACKGROUND OF THE INVENTION

With a gradual miniaturization of an electronic appliance and a development of a wireless broadcasting/communication technology, a technology for using an electronic appliance such as a notebook or a TV anywhere at anytime is developed. Accordingly, it is required to supply an electronic appliance with a plurality of power sources having different characteristics from one another; convert a power source supply path in order to provide the electronic appliance with a specific power source when the power source is applied thereto; choose a power source among a plurality of power sources when the plurality of power sources are applied to the electronic appliance at the same time; and reliably provide a power source to the electronic appliance regardless of characteristics of the power source applied thereto.

A TV may be classified into a household TV, a portable TV and a vehicle TV. In case of home, a power source is connected to an electronic appliance through an adaptor for transforming an AC power source received from a general power line into a low DC voltage suitable for operating a TV. In case that an appropriate power source cannot be found, a power supply to an electronic appliance may be available by a portable charging battery. Further, in case of a vehicle, a DC power source of the vehicle may be provided to an electronic appliance via a vehicle power source adaptor (so called cigar jack).

Conventionally, a technique for automatically converting an input power source mode of an electronic appliance by automatically detecting an input power source thereof has not been developed though the electronic appliance has been manufactured to use various types of power sources as mentioned above. Accordingly, a user had to convert a power source mode of the electronic appliance manually.

Further, an adaptor power source from a home power line and a battery power source from a charging battery can provide an electronic appliance with a proper voltage suitable for reliably operating the electronic appliance. However, a vehicle cigar jack power source has a drawback that it often supplies an over voltage to an electronic appliance when a vehicle is running in high speed. Accordingly, when an over voltage is generated in a power source output line, it is required to cut off a supply of a power source in order to protect an electronic appliance from over voltage.

SUMMARY OF THE INVENTION

Accordingly, the present invention has been made to solve the above-mentioned problems occurring in the prior art, and an object of the present invention is to provide an apparatus and a method for automatically detecting a power source applied thereto and then converting the detected power source to an input power source thereof when one power source among a plurality of power sources is applied thereto.

Further, it is another object of the present invention to provide an apparatus and a method for cutting off a power source immediately when an over voltage is generated in an output line of the power source.

In accordance with a first aspect of the present invention, there is provided a voltage controller equipped with an electronic appliance. The electronic appliance selectively uses a plurality of power sources including a battery power source and an adaptor power source. The voltage controller detects a power source among the plurality of power sources and converts an input power source to the power source.

In accordance with a second aspect of the present invention, in a voltage controller equipped with an electronic appliance using a plurality of power sources including a battery power source and an adaptor power source, the voltage controller cuts off an over voltage higher than a predetermined voltage when a power source is applied to the electronic appliance.

In accordance with a third aspect of the present invention, in a voltage controller equipped with an electronic appliance using a plurality of power sources including a battery power source and an adaptor power source, the voltage controller converts a specific power source to an input power source and cuts off an over voltage higher than a predetermined voltage when a power source is applied to the electronic appliance.

In accordance with the first and third aspects of the present invention, an input power source conversion unit controls an input power source and includes a battery power supply path and an adaptor power supply path. The battery power supply path includes a transistor turning on/off according to an input voltage. Further, the input power source conversion unit includes a diode having an anode connected to an input port of an adaptor power source and a cathode connected to an output line of the voltage controller; and two resistors connected to a connecting point between the input port of the adaptor power source and the diode. Moreover, a gate of the transistor Q1 is connected between the two resistors. By using this configuration, a gate state of the transistor is determined according to a voltage drop across the two resistors, the voltage drop occurring when the adaptor power source is applied.

In accordance with the second and third aspects of the present invention, an output voltage cutoff unit shuts off an over voltage and includes a first transistor turning on/off according to a control signal sent from a control unit and a second transistor having a gate in a source-drain path of the first transistor and source-drain connected to an output line of the input power source conversion unit.

In accordance with a fourth aspect of the present invention, there is provided a method for controlling a voltage when a power source among a plurality of power sources is applied to a voltage controller equipped with an electronic appliance, the plurality of power sources including a battery power source and an adaptor power source and the electronic appliance capable of using the plurality of power sources selectively. The method includes the steps of: detecting a voltage of the power source inputted to the voltage controller; determining a power supply path according to the detected voltage; outputting an electric power of the power source along the power supply path; detecting a voltage of the power source before the voltage outputted from the voltage controller reaches the electronic appliance; determining whether the detected voltage is higher than a predetermined voltage; outputting a control signal for cutting off the power supply path if the detected voltage is higher than the predetermined voltage; and cutting off the power supply path according to the control signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
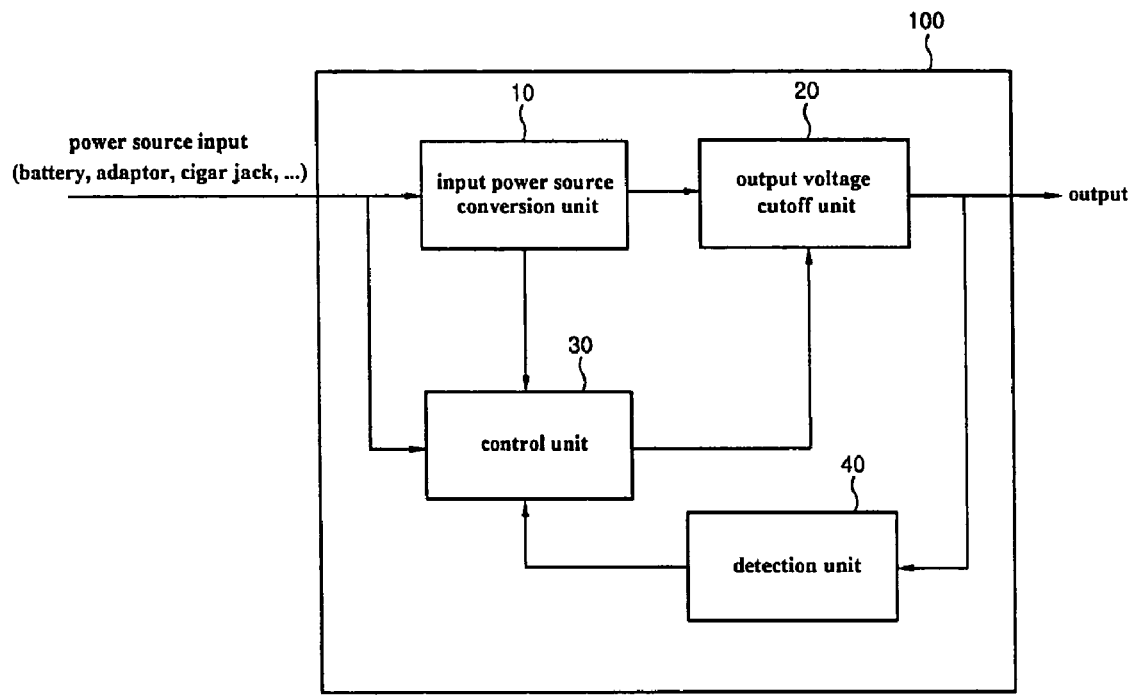
FIG. 1 is a schematic block diagram of a voltage controller in accordance with an embodiment of the present invention.

FIG. 1 is a schematic block diagram of a voltage controller in accordance with an embodiment of the present invention. At least one power source among various types of power sources such as a battery power source, an adaptor power source and a cigar jack power source can be connected to a input power source conversion unit 10. The input power source conversion unit 10 automatically selects a specific power source applied thereto. Then, a voltage outputted from the input power source conversion unit 10 is transmitted to an output line of a voltage controller 100 through an output voltage cutoff unit 20. At this time, the output voltage transmitted to the output line is detected by a detection unit 40 and the detected voltage is sent to a control unit 30. The control unit 30 determines whether the detected voltage is lower than a predetermined voltage (e.g., 12 V±10% in case that an electronic appliance is a TV) or not. If the detected voltage is lower than the predetermined voltage, the control unit 30 controls the output voltage cutoff unit 20 to output the output voltage normally. Otherwise, the control unit 30 operates the output voltage cutoff unit 20 to cut off the output voltage.

Figure 2:
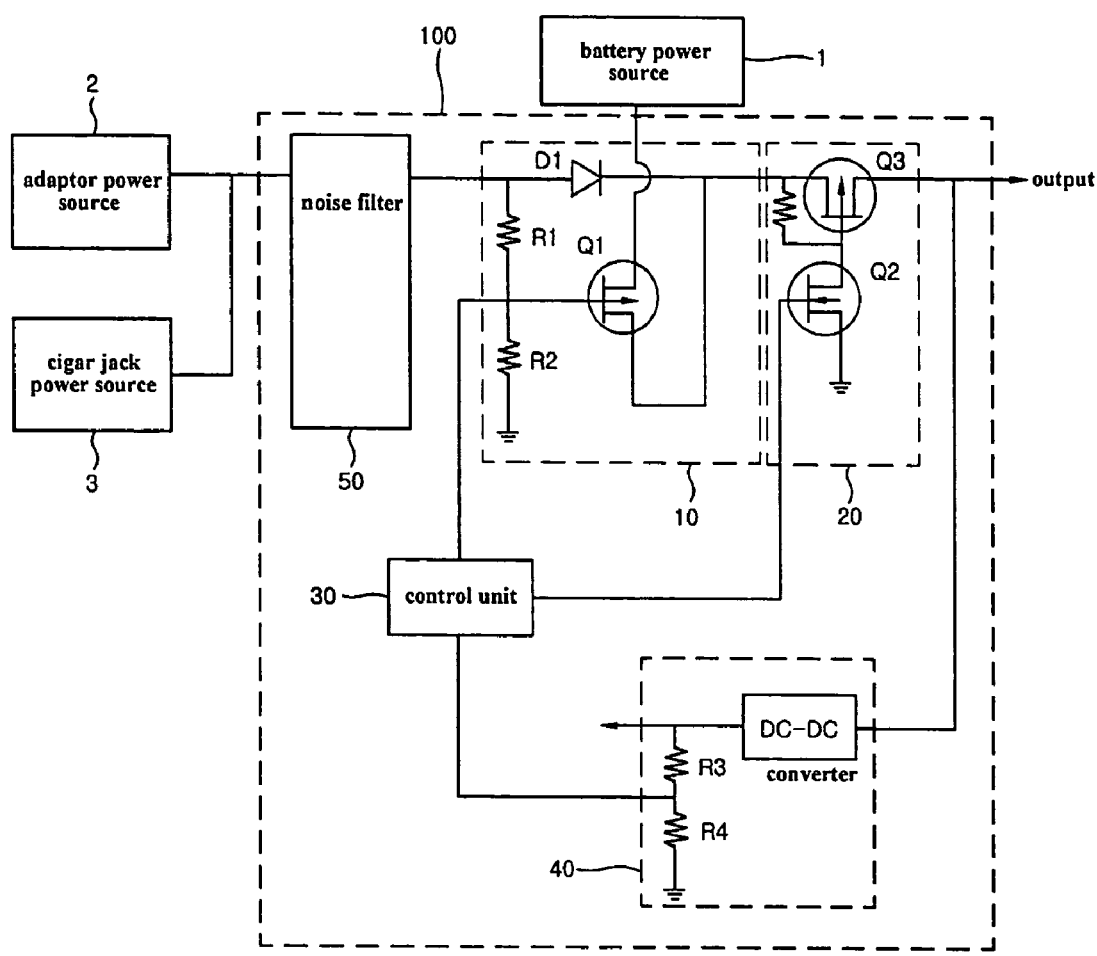
FIG. 2 shows a detailed block diagram of the block diagram shown in FIG. 1.

FIG. 2 is a detailed block diagram of the block diagram shown in FIG. 1. The same reference numerals will be given to designate the same components of FIG. 1. As shown in FIG. 2, power sources used in an electronic appliance include a battery power source 1, an adaptor power source 2, a cigar jack power source 3 and the like. The battery power source 1 may be connected to the electronic appliance through a battery port and then an electric power is supplied thereto via a battery power supply path. Further, the adaptor power source 2 and the cigar jack power source 3 can be connected to the electronic appliance through a common adaptor port and then an electric power is provided thereto via an adaptor power supply path after eliminating an unnecessary noise by a noise filter 50. Thereafter, the electric power from the various types of power sources is outputted to a single output line via the input power source conversion unit 10.

The input power source conversion unit 10 includes the battery power supply path and the adaptor power supply path. If an electric power is inputted to the input power source conversion unit 10, the input power source conversion unit 10 selects the battery power supply path or the adaptor power supply path as an input power supply path.

In the battery power supply path, an output port of the battery power source 1 is connected to a source of a transistor Q1.

In the adaptor power supply path, an electric power of the adaptor power source 2 or the cigar jack power source 3 can be inputted through the single common port, and then a noise is eliminated by the noise filter 50. Thereafter, an output port of the noise filter 50 is branched in such a manner that one branch is connected to a diode D1 and the other branch is connected to a resistor R1 and a resistor R2 which is grounded. The control unit 30 and a gate of the transistor Q1 in the battery power supply path are connected between the resistor R1 and the resistor R2. Accordingly, an operation of the transistor Q1 is determined according to a voltage drop across the resistors R1 and R2. For instance, when the transistor Q1 is a FET of p channel type, the transistor Q1 is turned on if a gate voltage is lower than a source-drain voltage, and otherwise, the transistor Q1 is turned off.

Hereinafter, an operation of the input power source conversion unit 10 will be explained. If an electric power of the adaptor power source 2 is inputted, a gate voltage of the transistor Q1 is in HIGH state since a voltage is distributed by the resistors R1 and R2. At this time, if the transistor Q1 is a p channel type, it turns off. If the transistor Q1 turns off like this, the battery power supply path is also cut off and the electric power of the adaptor power source 2 or the cigar jack power source 3 is provided to the output line of the voltage controller 100 through the diode D1 along the adaptor power supply path.

If an electric power from the adaptor power source 2 or the cigar jack power source 3 is not applied to the voltage controller 100, a voltage drop across the resistors R1 and R2 may not occur. Accordingly, the gate voltage of the transistor Q1 is in LOW state; the transistor Q1 turns on; and an electric power of the battery power source 1 is provided via the battery power supply path.

If both the cigar jack power source 3 (or the adaptor power source 2) and the battery power source 1 are connected to the voltage controller 100 along the adaptor power supply path and the battery power supply path, respectively, the transistor Q1 turns off by the voltage drop across the resistors R1 and R2. That is, even if one of the cigar jack power source 3 and adaptor power source 2 in the adaptor power supply path is connected to the voltage controller 100, the gate voltage of the transistor Q1 is in HIGH state; the transistor Q1 turns off; and the battery power source 1 is cut off.

The gate of the transistor Q1 of the input power source conversion unit 10 is connected to the control unit 30. If the gate voltage of the transistor Q1 is in LOW state, a signal informing the control unit 30 that an electric power is inputted by the battery power source 1 is supplied to the control unit 30. Otherwise, a signal informing the control unit 30 that an electric power is inputted from the adaptor power source 2 (or the cigar jack power source 3) is sent to the control unit 30.

The output voltage cutoff unit 20 includes a transistor Q2 connected to the control unit 30 and a transistor Q3 connected with the output line of the input power source conversion unit 10. A gate of the transistor Q2 is connected to the control unit 30; a source thereof is connected to a gate of the transistor Q3; a drain thereof is grounded; a source of the transistor Q3 is connected to the output line of the input power source conversion unit 10; and a drain thereof is connected to the output line of the voltage controller 100.

The detection unit 40 includes a DC-DC converter connected with the output line of the transistor Q3 of the output voltage cutoff unit 20. The DC-Dc converter steps-down or steps-up the voltage outputted from the output voltage cutoff unit 20 thereby to make the output voltage into a proper voltage for an electronic appliance (e.g., 12 V±10%). The DC-Dc converter, however, can merely regulate the voltage to a some extend. That is, it is difficult for the DC-Dc converter to regulate an over voltage which is higher than a certain voltage. Accordingly, the control unit 30 determines whether the voltage sent from the detection unit 40 is higher than a predetermined voltage and if so, the control unit 30 controls the output voltage cutoff unit 20 to shut off the output voltage.

For instance, when the transistor Q2 is a FET of n channel type, the transistor Q1 is turned on if a gate voltage is higher than a source-drain voltage. If the voltage from the detection unit 40 is higher than a predetermined voltage, i.e., the voltage is an over voltage, the control unit 30 transmits a LOW level signal to the transistor Q2 thereby making the transistor Q2 to turn off and cutting off the output voltage. Further, if the voltage from the detection unit 40 is lower than the predetermined voltage, i.e., the voltage is in a normal state, the control unit 30 transmits a HIGH level signal to the transistor Q2 thereby making the transistor Q2 to turn on and providing the output voltage smoothly.

Figure 3:
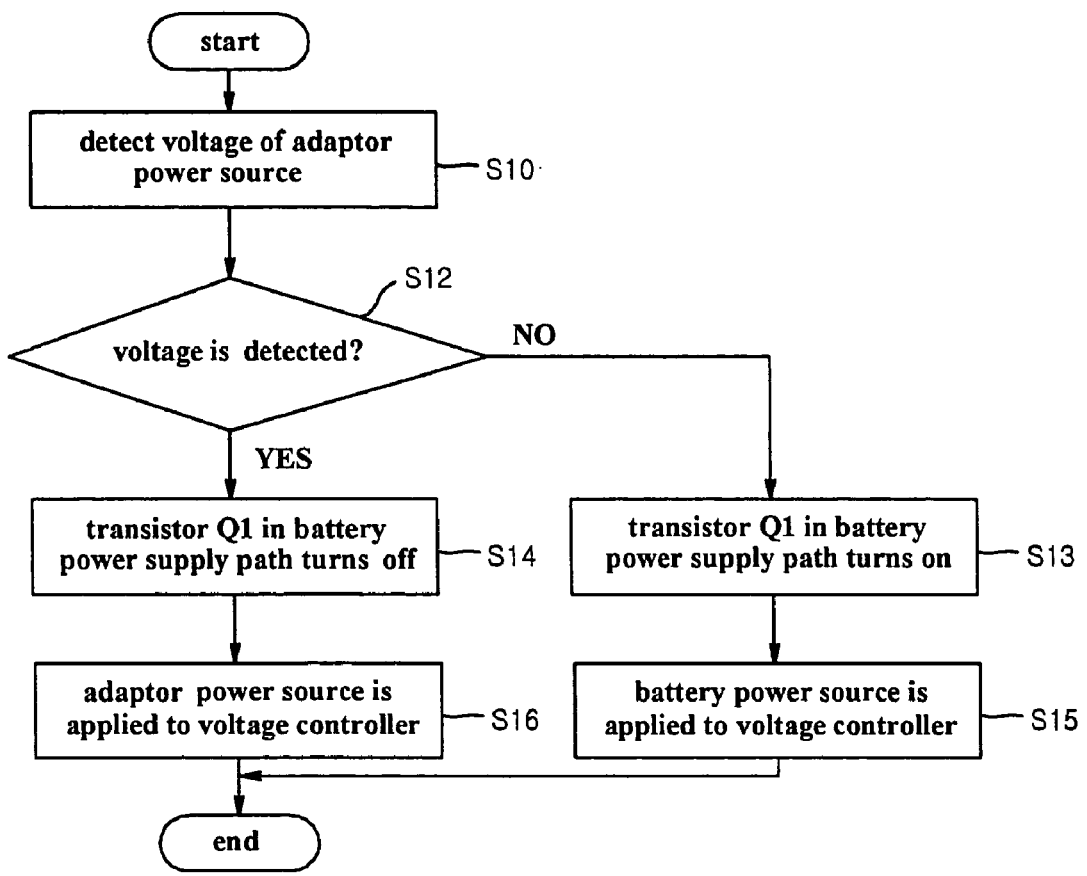
FIG. 3 provides a flow chart showing a method for converting an input power source in accordance with an embodiment of the present invention.

FIG. 3 is a flow chart showing a method for converting an input power source in accordance with an embodiment of the present invention. Hereinafter, a method for converting an input power source will be described with reference to FIGS. 2 and 3.

The input power source conversion unit 10 detects a voltage of the adaptor power source 2 (step 10). When the voltage of the adaptor power source 2 is detected by the input power source conversion unit 10, a voltage drop across the resistors R1 and R2 occurs, thereby making the gate voltage of the transistor Q1 to be in HIGH state. Accordingly, a specific power source is determined according to the detected voltage (step 12).

If an electric power of the adaptor power source 2 is inputted, the transistor Q1 in the battery power supply path turns off and then the battery power supply path is also cut off (step 14).

If an electric power of the adaptor power source 2 is not inputted at step 12, the transistor Q1 in the battery power supply path turns on and then the battery power supply path is also in ON state (step 13).

Figure 4:
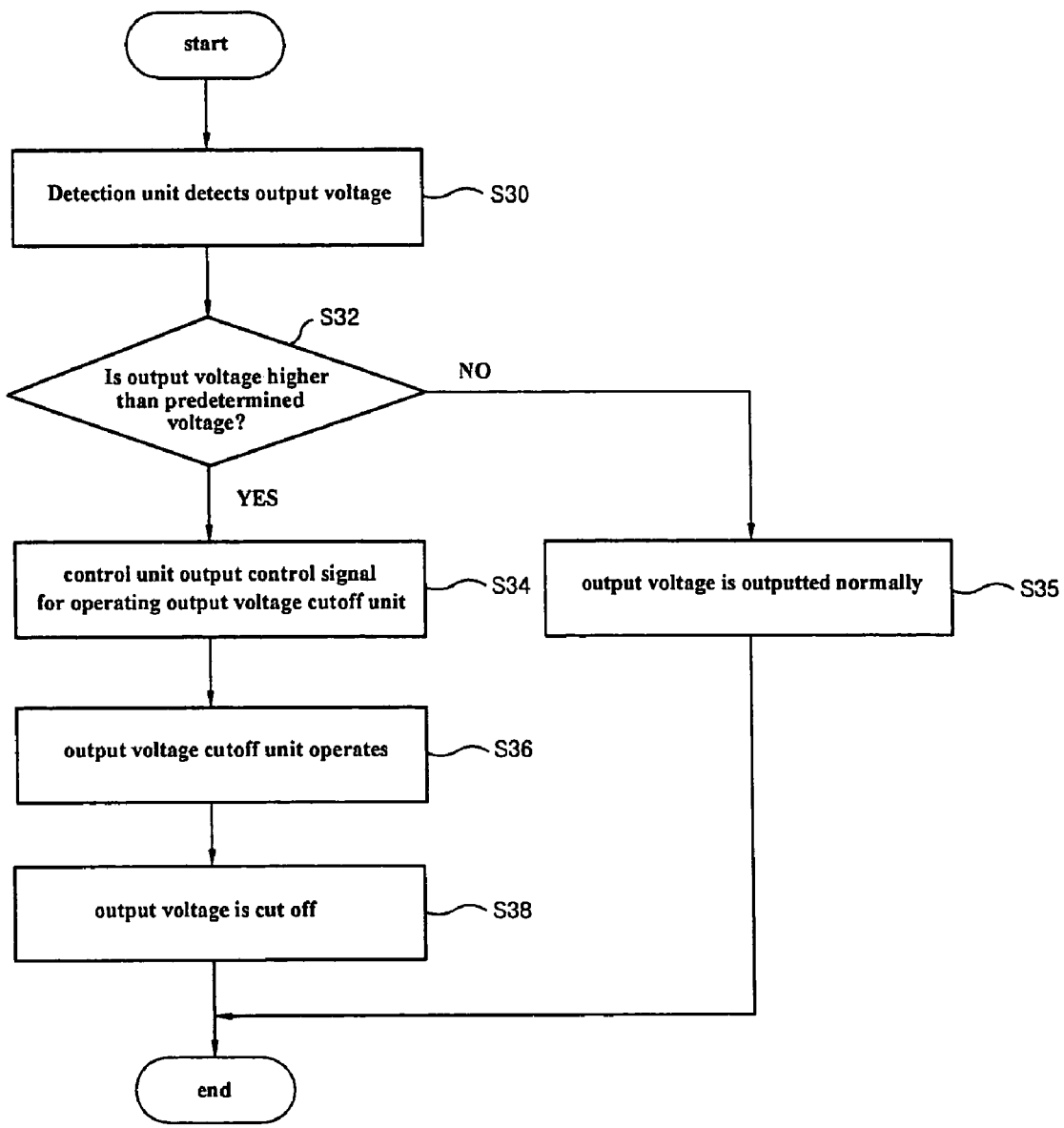
FIG. 4 is a flow chart showing a method for cutting off an over output voltage in accordance with an embodiment of the present invention.

FIG. 4 is a flow chart showing a method for cutting off an over output voltage in accordance with an embodiment of the present invention. Referring to FIG. 4, the detection unit 40 detects the output voltage of the voltage controller 100 (step 30). The control unit 30 determines whether the detected voltage is lower than a predetermined voltage (e.g., 12 V±10%) or not. The predetermined voltage is set to a value capable of breaking an electronic appliance. For example, a TV may operate from about 5V or 12V power supply. If the TV is set to operate from 5V power supply, the predetermined voltage is set to about 12V. If the detected voltage is lower than the predetermined voltage, the control unit 30 controls the output voltage cutoff unit 20 to output the output voltage normally (step 35). If the voltage from the detection unit 40 is higher than the predetermined voltage, the control unit 30 transmits a control signal for turning off the transistor Q3 of the output voltage cutoff unit 20 (step 34). For example, when the transistors Q2 and Q3 are FETs of n channel type, the control signal may be a LOW level signal. The transistor Q3 of the output voltage cutoff unit 20 turns off in response to the control signal (step 36), thereby cutting off the power supply path and the output voltage (step 38).

Figure 5:
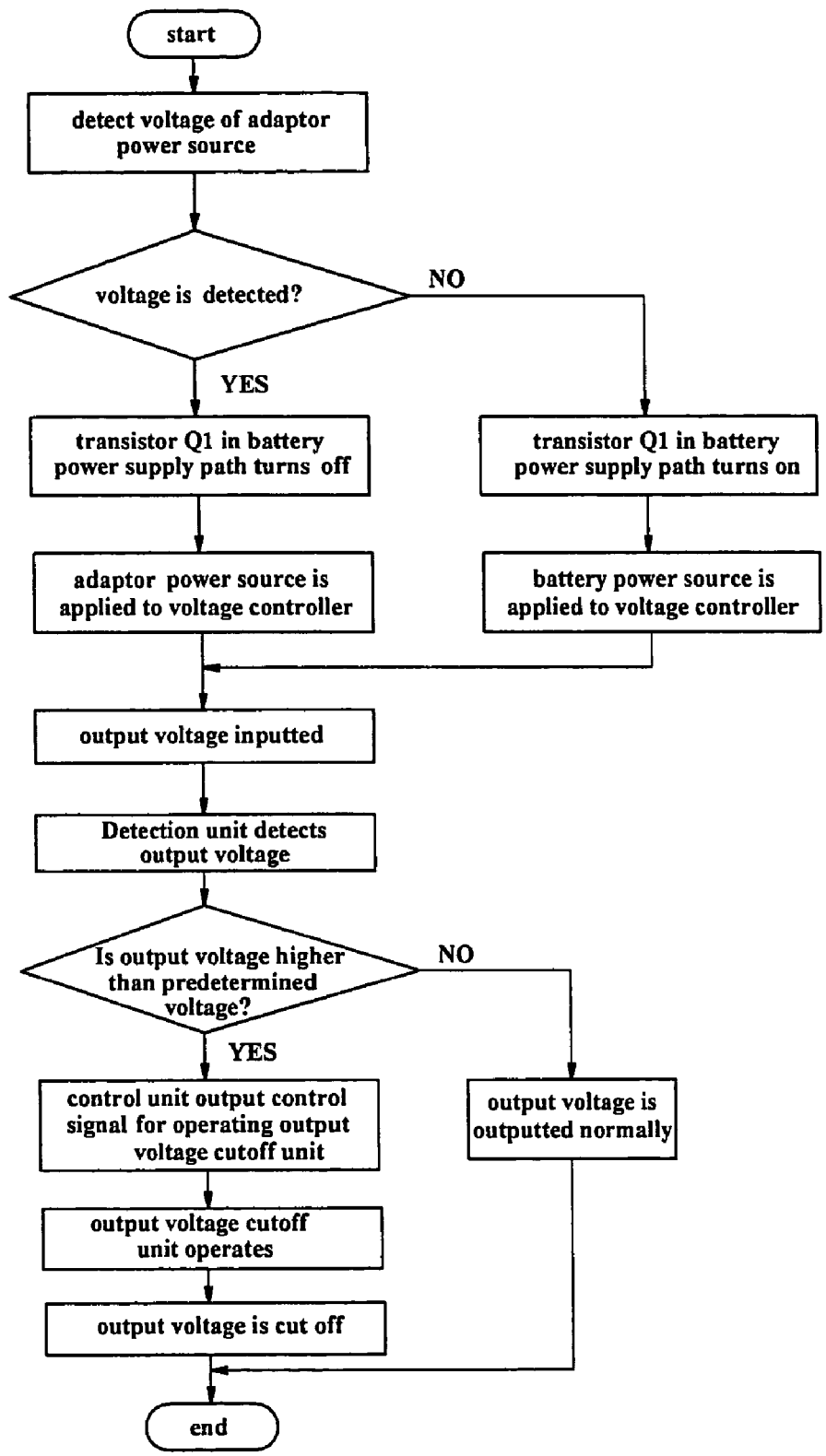
FIG. 5 is a flow chart showing a method for converting an input power source and cutting off an over output voltage in accordance with an embodiment of the present invention.

FIG. 5 is a flow chart showing a method for converting an input power source and cutting off an over output voltage in accordance with an embodiment of the present invention. Since FIG. 5 shows a method combining a method shown in FIG. 3 and a method shown in FIG. 4, detailed explanation will be omitted.

According to the present invention, when a power source is applied to an electronic appliance using various types of power sources, an input voltage is detected automatically and then a power supply path corresponding to the detected voltage is selected. Therefore, when a user watches a TV out of doors and then watches the TV in a vehicle or at home again, a power supply path is converted automatically upon connecting an adaptor or cigar jack to the TV. Accordingly, the user doesn't have to convert the power supply path manually.

According to the present invention, even if an unstable power source, e.g., a vehicle cigar jack, is connected to an electronic appliance, a user can operate the electronic appliance safely because a power supply path is cut off immediately when an over voltage is supplied thereto.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, though a TV has been described as an electronic appliance using various types of power sources, the present invention may be applied to a communication appliance such as a notebook and a home appliance such as an electric cleaner.

Although a transistor of p channel type has been described as a transistor of the input power source conversion unit and a transistor of n channel type has been described as a switch of the output voltage cutoff unit, a transistor of any type can be applied. Further, though the preferred embodiments has been described for the case where a circuit cuts off a battery power source and provides an adaptor power source when the battery power source and the adaptor power source are applied simultaneously, the embodiment can be configured again in such a manner that the adaptor power source is cut off and the battery power sources is provided.

What is claimed is:

1. A voltage controller for use in an electronic appliance using a plurality of power sources, the voltage controller comprising:

a battery power source and a first path to which the battery power source is coupled;

an adaptor power source and a second path to which the adaptor power source is coupled;

an input power source conversion unit which includes a first transistor adapted to be turned on/off to selectively provide power from the battery power source via the first path, and wherein the second path provides power from the adaptor power source;

an output voltage cutoff unit, connected to an output line of the voltage controller, for preventing the output line from outputting a power signal from either of the battery power source or the adaptor power source when an over-voltage condition is detected;

a detection unit, connected to an output line of the output voltage cutoff unit, for detecting a voltage outputted from the output line of the output voltage cutoff unit; and a control unit for outputting a control signal to operate the output voltage cutoff unit to prevent the output line from outputting said voltage from either the battery power source or adaptor power source when the voltage detected by the detection unit is greater than a predetermined voltage corresponding to the overvoltage condition, wherein the output voltage cutoff unit includes a first switch connected to the control unit and a second switch having one end connected to the first switch and another end connected to the output line of the output voltage cutoff unit.

2. The voltage controller of claim 1, wherein the predetermined voltage is a value ranging from about 10.8 V to 13.2 V.

3. The voltage controller according to claim 1, further comprising a noise filter coupled to the second path to which the adaptor power source is applied.

4. The voltage controller according to claim 1, wherein the adaptor power source is an adaptor power source from a line or a cigar jack power source for a vehicle.

5. The voltage controller of claim 1, wherein first switch of the output voltage cutoff unit is coupled to receive power from the first path and the second path, wherein the first switch is controlled to allow a power signal from the battery power source to be output on the output line when the voltage detected by the detection unit is less than the predetermined voltage corresponding to the overvoltage condition.

6. The voltage controller of claim 5, wherein the first switch includes a first transistor for turning on and off based on a voltage on the second path.

7. The voltage controller of claim 6, wherein the first transistor is a FET having a gate connected to the second path, a source connected to the first path and a drain connected to the output line.

8. The voltage controller of claim 6, wherein the second path includes:

a diode D1 having an anode connected to an input port of the adaptor power source and a cathode connected to the output line; and resistors R1 and R2 connected between a reference potential and a connecting point between the input port of the adaptor power source and the diode, wherein a gate of the first transistor is connected between the resistors R1 and R2 such that a state of the first transistor is determined according to a voltage drop across the resistors R1 and R2, the voltage drop occurring based on a voltage on the second path derived from a power signal from the adaptor power source.

9. The voltage controller according to claim 1, wherein the first switch is controlled by the control unit and the second switch is controlled based on an output of the first switch to block or allow a power signal from either of the battery power source or the adaptor power source to be output from the output line.

10. The voltage controller of claim 1, wherein the first switch and the second switch respectively include or correspond to a first transistor and a second transistor that each turn on and off.

11. The voltage controller of claim 10, wherein the first transistor is a FET having a gate connected to the control unit, a source connected to a gate of the second transistor and a drain connected to ground, and the second transistor is a FET having a drain connected to an output line of the electronic appliance and a source.

12. The voltage controller of claim 10, wherein the control unit outputs a LOW level signal to turn off the second transistor when the detected voltage sent from the detection unit is greater than the predetermined voltage and outputs a HIGH level signal to turn on the second transistor when the detected voltage sent from the detection unit is less than the predetermined voltage.

13. The voltage controller of claim 9, wherein the detection unit includes a DC-DC converter connected to the output line of the output cutoff unit.

14. The voltage controller of claim 13, wherein the detection unit includes a first resistor connected to the DC-DC converter and a second resistor connected to ground and the control unit is connected between the first and second resistors.

15. The voltage controller of claim 5, wherein the first switch is controlled based on a voltage on the second path to allow the power signal from the battery power source to be output on the output line.

16. The voltage controller of claim 15, wherein the first switch allows the power signal from the battery power source to be output on the output line when the voltage on the second path is at least substantially zero.

17. The voltage controller of claim 15, wherein the predetermined voltage value at least substantially corresponds to a gate cutoff voltage of a transistor which corresponds to or is included in the first switch.

18. A method for managing power to an electronic appliance, comprising:

selecting to receive power from a first path or a second path, the first path coupled to receive power from a DC power source and the second path coupled to receive power from an adaptor power source;

detecting power along the selected path; and preventing power from either of the first path or the second path from being output on an output line coupled to the electronic appliance when power from the selected path exceeds an over-voltage threshold value, wherein voltages exceeding the over-voltage threshold value exceed one or more predetermined operating requirements of the electronic appliance, and wherein said preventing is performed by an output voltage cutoff unit having a first switch coupled to a control unit that controls the output voltage cutoff unit as a result of the power from the selected path exceeding said over-voltage threshold value, and a second switch having one end connected to the first switch and another end connected to the output line.

19. The method of claim 18, further comprising:

detecting power on the first path and the second path simultaneously, wherein said selecting includes selecting the second path and switching off the first path based on said simultaneous detection of power on the first and second paths.

20. A method for managing power to an electronic appliance, comprising:

by using a first transistor which is adapted to be turned on/off, selectively providing power from a battery power source via a first path and providing power from an adaptor power source coupled to a voltage controller via a second path;

detecting a voltage output from the voltage controller before the voltage reaches the electronic appliance;

determining whether the detected voltage is higher than a predetermined voltage;

outputting a control signal for preventing power from both the first and second paths from reaching the electronic appliance if the detected voltage is higher than the predetermined voltage, wherein the control signal controls a switch to prevent said power from reaching the electronic appliance from the first and second paths, wherein outputting the control signal is performed by an output voltage cutoff unit that includes a switch connected to a control unit that controls the output voltage cutoff unit as a result of the detected voltage being higher than the predetermined voltage, and a second switch having one end connected to the first switch and another end connected to an output line that leads to the electronic appliance.

21. A method for controlling a voltage when one or more power sources among a plurality of power source is applied to a voltage controller equipped with an electronic appliance, the plurality of power sources including a battery power source and an adaptor power source and the electronic appliance capable of using the plurality of power sources selectively, the method comprising:

detecting an output voltage of the voltage controller before the output voltage reaches the electronic appliance;

determining whether the detected voltage is higher than a predetermined voltage; and outputting a control signal for preventing power from either of the battery power source or the adaptor power source from being output to the electronic appliance if the detected voltage is higher than the predetermined voltage, wherein the control signal controls a switch to prevent said power from either of the battery power source or the adaptor power source from reaching the electronic appliance from the first and second paths, and wherein outputting the control signal is performed by an output voltage cutoff unit having a first switch coupled to a control unit that controls the output voltage cutoff unit as a result of the power from the selected path exceeding said over-voltage threshold value, and a second switch having one end connected to the first switch and another end connected to an output line of the electronic appliance.

* * * * *